United States Patent [19]

Oehm et al.

[11] 3,931,988

[45] Jan. 13, 1976

[54] VEHICLE SAFETY DEVICE

[75] Inventors: Klaus Oehm, Wolfsburg; Ulrich Seiffert, Braunschweig; Burckhard Strüwe, Fallersleben; Ernst Fiala, Wolfsburg; Andreas Bauer; Ruediger Weissner, both of Fallersleben; Wilfried Schwanz, Ahnsen, all of Germany

[73] Assignee: Volkswagenwerk Aktiengesellschaft, Wolfsburg, Germany

[22] Filed: Sept. 28, 1973

[21] Appl. No.: 401,680

[30] Foreign Application Priority Data

Sept. 28, 1972 Germany............................ 2248003

[52] U.S. Cl. ............................... 280/150 B; 180/90
[51] Int. Cl.² .......................................... B60R 21/10
[58] Field of Search .... 280/150 B, 150 AB, 150 SB; 180/90; 293/71 P; 188/1 C

[56] References Cited
UNITED STATES PATENTS

| | | | |
|---|---|---|---|
| 2,833,554 | 5/1958 | Ricordi | 280/150 B |
| 3,262,716 | 7/1966 | Graham | 280/150 B |
| 3,468,556 | 9/1969 | Smith | 280/150 B |
| 3,764,161 | 10/1973 | Bright et al. | 280/150 SB |
| 3,774,713 | 11/1973 | Stegmaier | 280/150 B X |
| 3,806,154 | 4/1974 | Akiyama | 280/150 B |
| 3,833,238 | 9/1974 | Liard | 280/150 SB |

FOREIGN PATENTS OR APPLICATIONS

| | | | |
|---|---|---|---|
| 1,923,305 | 10/1970 | Germany | 280/150 B |
| 1,124,164 | 6/1956 | France | 280/150 B |

*Primary Examiner*—Leo Friaglia
*Assistant Examiner*—Michael J. Forman
*Attorney, Agent, or Firm*—Brumbaugh, Graves, Donohue & Raymond

[57] ABSTRACT

A safety device for a passenger in an automobile comprises a shoulder safety belt extending diagonally across the passenger's body and an energy absorbing impact element located on the vehicle frame adjacent the passenger's knees. The impact element includes two M-shaped sheet metal members arranged one above the other and symmetrical about a plane passing between the members. The legs of each M-shaped member afford two parallel, spaced-apart plates and one face of one of the plates is presented to the passenger's knees. The portion of each M-shaped member intermediate the legs affords a plastically deformable connection between the plates.

2 Claims, 3 Drawing Figures

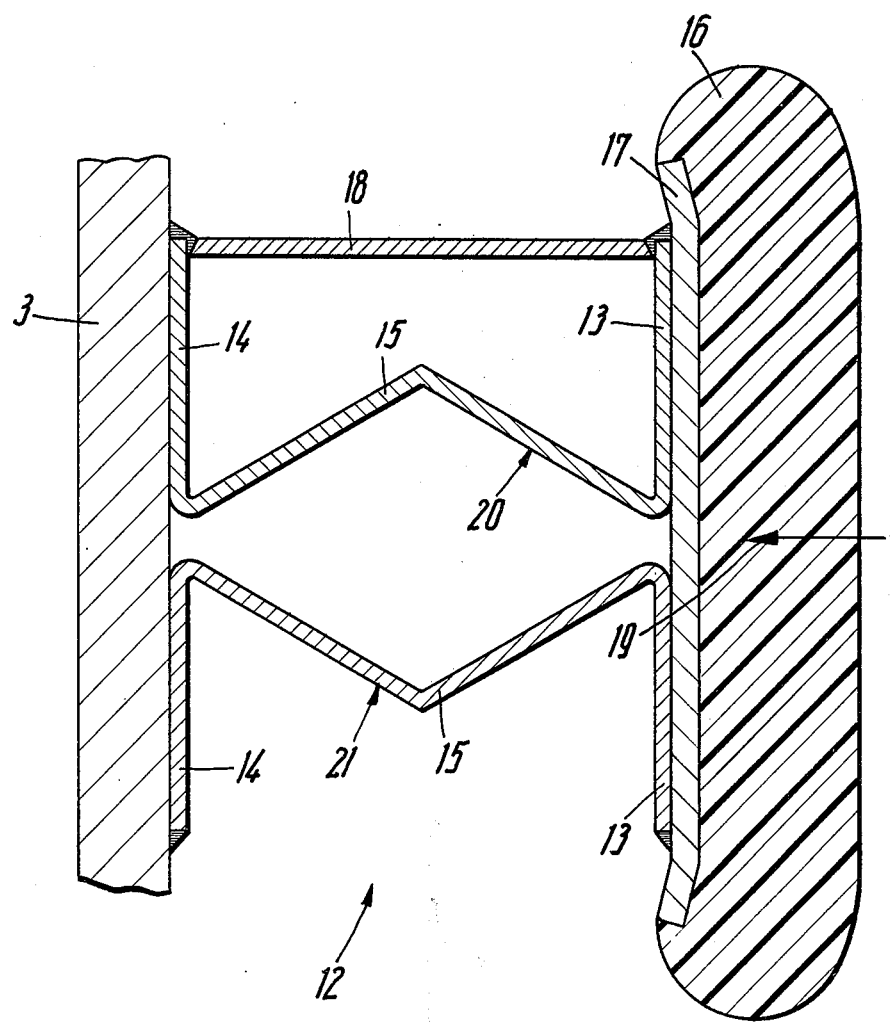

VEHICLE SAFETY DEVICE

BACKGROUND OF THE INVENTION

To protect passengers in a vehicle, such as an automobile, against injury in the event of a collision, the potentially injurious effects of the high deceleration forces acting on the vehicle as a result of the collision must be moderated. One commonly practiced method of moderating the effects is to hold the passengers securely against portions of the vehicle, such as its seats. The passengers thus decelerate at essentially the same instant and the same rate as the vehicle and are not "thrown," as the result of differing times or rates of deceleration, against parts of the vehicle interior.

The most widely used device for securely holding a passenger in an automobile is a safety belt that straps the passenger firmly to his seat. Safety belts may be categorized into two general classes: two-point safety belts and three-point safety belts. A two-point safety belt includes a single belt or strap that is attached to the automobile frame or chassis at two points, located one on either side of an automobile seat. The belt is generally arranged to extend across a passenger's lap, but may instead extend diagonally across his body from one shoulder to the opposite hip. A three-point safety belt includes two belts or straps that are joined together so that only three connections are necessary to secure the ends of the belts to the automobile. Generally, a three-point belt is a combination lap belt and diagonal shoulder belt.

In order for a safety belt to be effective, it must be properly adjusted and fastened around a passenger sitting in an associated automobile seat. The typical safety belt is therefore provided with an adjustably positioned, releasable buckle so that the passenger may fasten and adjust the belt about his body after he is seated. Nonetheless, many people regard having to fasten and adjust a safety belt as an annoying inconvenience, and thus the effectiveness of a safety belt is often wasted because passengers do not use it. To eliminate the inconvenience of having to fasten a safety belt, it has previously been proposed to fasten one end of the belt on the adjacent automobile door. When the door is opened, the safety belt swings away from its associated seat to allow a passenger to enter or leave the automobile without handling the belt. When the door is closed, the safety belt swings into position about its associated seat and the body of a passenger who may be seated in it. The additional length of safety belt necessary for the arrangement is taken up on an automatic winding spool when the door is closed. The automatic take-up also assures a close engagement of the belt with a passenger's body. A locking mechanism on the spool prevents the belt from unwinding when an impact load is applied to the belt as a result of a collision. Such a safety belt arrangement which does not require the user to buckle or unbuckle the belt is commonly designated a passive safety device.

Although the safety belt arrangements described above have been shown to be of value in preventing injuries to automobile passengers involved in an accident, they also have certain disadvantages. For example, a three-point safety belt effectively restrains both the upper and lower portions of a passenger's body, or, more specifically, his torso, but the two part construction and three-point mounting of the belt make entering and leaving an automobile rather difficult, particularly for passengers in the rear seat of a two-door automobile. Moreover, if a three-point belt is adapted to function as a passive safety device, as described above, the cost of the belt, which is already greater than the cost of a two-point belt, is further increased. On the other hand, a two-point safety belt, while less expensive and cumbersome than a three-point belt, can only restrain either the upper or the lower portion of a passenger's body. In the event of an accident, therefore, the unrestrained portion of the passenger's body is free to move and consequently is more likely to be injured.

SUMMARY OF THE INVENTION

The present invention is directed to a safety device for passengers in a vehicle, such as an automobile, which provides the simplicity and convenience of a two-point safety belt and also the additional protection of a three-point safety belt. The safety device includes a restraint, such as shoulder safety belt, for the upper portion of a passenger's body and an energy absorbing impact element disposed on the vehicle adjacent the passenger's knees. The shoulder belt affords protective restraint for the upper portion of the passenger's body, while the lower portion of his body is protected by the impact element. The invention is particularly suited for use as a passive safety device in which one end of the shoulder belt is located on a door adjacent the vehicle seat associated with the safety device.

The impact element of the invention is spaced sufficiently from the knees of a passenger occupying the associated vehicle seat so that the element does not substantially hinder entry into or exit from the vehicle. At the same time, the impact element is located close enough to the passenger's knees to provide some restraint for the lower portion of his body in the event of a collision, in addition to absorbing the energy transferred on being struck by the passenger's knees. Although the impact element does not hold the passenger's lower body tightly against the vehicle seat, the slight sliding forward of the passenger's lower body permitted by the spacing of the element has been found to be advantageous in preventing injury. The forward movement of the passenger's lower body results in a downward sliding of the upper portion of his body underneath the diagonal shoulder belt and consequently, the passenger's head, or other portions of his upper body, are less likely to strike the steering wheel or dashboard.

In one embodiment of the invention, the energy absorbing impact element includes two generally parallel plates separated by a plastically deformable member. The plates are oriented in generally vertical planes and are also aligned generally perpendicular to the longitudinal axis of the vehicle. In the event of a collision, therefore, in which the vehicle passengers would probably be thrown forward in the passenger compartment, the plates will be essentially perpendicular to the direction of the impact force exerted on them. The deformable member permits energy absorbing deformation of the impact element so that the lower portion of a passenger's body is restrained without exceeding tolerable stresses.

The impact element is preferably fabricated of two lengths of sheet metal formed with M-shaped cross-sections. The sheet metal lengths are arranged one above the other and symmetrical about a plane passing between them. The legs of the M-shaped lengths are generally vertical and the corresponding right-and left-hand legs of the two lengths together define the two plates of the impact element. The portions of the sheet metal lengths intermediate the legs define the deformable member of the impact element. The cross-section of the deformable member is thus essentially rhombic and one diagonal of the cross-section is aligned generally parallel to the probable direction of the impact force to be applied on the impact element in the event of a collision. The rhombic cross-section of the deformable member provides particularly advantageous impact deformation of the member, as indicated by the force-distance and force-time curves for the member, both of which generally approximate a right angle.

The face of the impact element presented to the passenger is padded or cushioned to prevent possible injuries resulting from sharp edges. To incorporate the impact element into the interior design of the vehicle, the upper surface of the element may have a flat surface that functions as a shelf.

BRIEF DESCRIPTION OF THE DRAWINGS

For a better understanding of the invention, reference may be made to the following description of an exemplary embodiment, taken in conjunction with the figures of the accompanying drawings, in which:

FIG. 3 is an enlarged, cross-sectional view of the energy absorbing element of FIGS. 1 and 2.

DESCRIPTION OF EMBODIMENT

Figure 1:
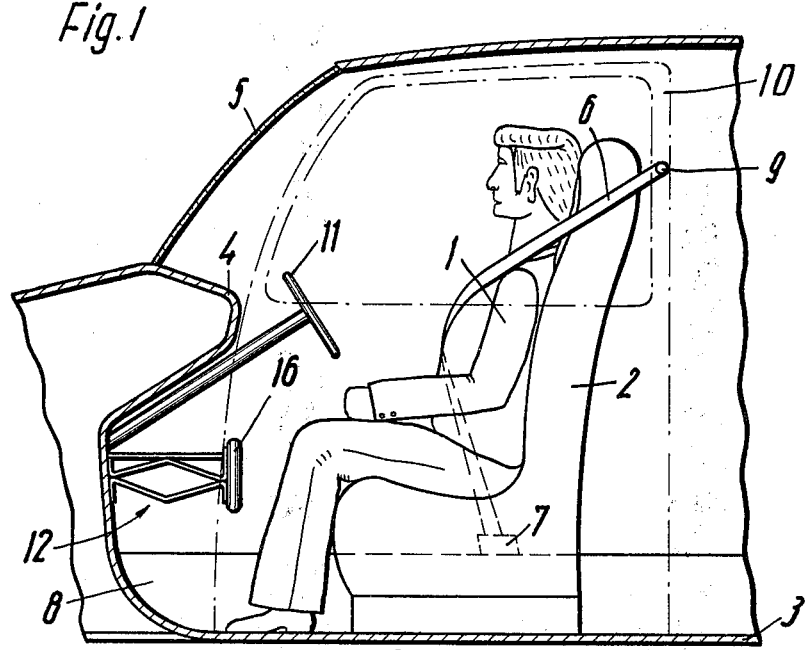
FIG. 1 is a partial side sectional view of a passenger seated in an automobile equipped with a safety device according to the invention.
Figure 2:
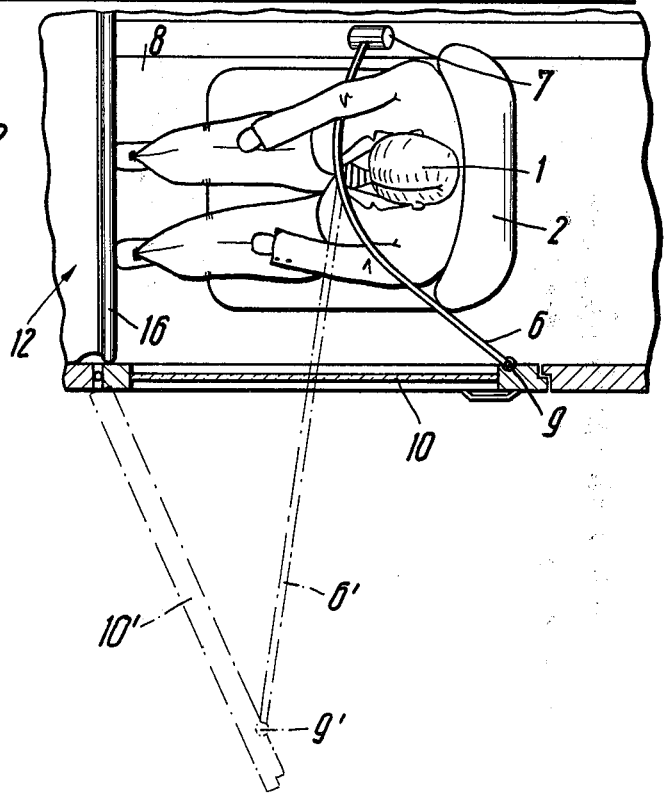
FIG. 2 is a plan view of the left-hand side of the automobile shown in FIG. 1.

FIGS. 1 and 2 of the drawings illustrate a man, generally designated 1, seated in the driver's seat 2 of a passenger automobile. In front of the man 1, the frame 3 of the automobile has been configured to provide an instrument panel or dashboard 4. Immediately above the instrument panel 4 is a windshield 5 that extends to the roof of the automobile. The steering wheel 11 for the automobile is mounted on a column extending from the frame 3 underneath the instrument panel 4.

In accordance with the invention, the man 1 is held in the seat 2 by a two-point safety belt 6. The safety belt 6 is a shoulder belt which is attached to the automobile on each side of the seat 2 and extends diagonally across the man 1 from his left shoulder to his right hip. The lower or right-hand end of the safety belt 6 is secured to the tunnel or hump 8 through which extends the drive-shaft for the automobile. An automatic winding spool 7 is mounted on the drive-shaft tunnel 8 automatically to wind up any excess length of the safety belt 6 which is not in use. The spool 7 may be of any conventional type that can be conveniently used with a shoulder safety belt. The upper or left-hand end of the safety belt 6 is attached to the automobile door 10 adjacent the seat 2 by a bracket 9. The bracket 9 is preferably located on the upper rear portion of the door 10, as viewed from the left side of the automobile. As previously described, mounting the bracket 9 on the door 10 permits the safety belt 6 to function as a passive safety device. The bracket 9 may, however, be located on the automobile frame 3 adjacent the door 10, if it is not desired to utilize the invention as a passive device.

When the door to the automobile is open, as shown in phantom in FIG. 2, the safety belt 6 is fully unwound from the spool 7 and assumes the position indicated as 6' to permit convenient and unhindered entry into or exit from the automobile. When the door 10 is closed, the safety belt 6 automatically assumes its proper restraining position about the body of the man 1 seated in the seat 2. In the event of an impact load being applied to the safety belt 6, as in the event of a collision, a locking device (not shown) associated with the spool 7 prevents the safety belt 6 from unwinding from the spool and thus holds the man 1 securely against the automobile seat 2.

An energy absorbing impact element, generally designated 12, is mounted on the automobile frame 3 underneath the instrument panel 4 and the steering wheel 11. The impact element is thus located generally in the zone of the man's knees, when he is seated in the seat. Sufficient space has been left between the impact element 12 and the seat 2 to permit relatively unhindered entry into and exit from the automobile. In addition, when the man 1 is occupying the seat 2, he will have room to move his legs and operate the automobile floor pedals (not shown), for example. To fit the impact element 12 into the interior design of the automobile, the element has a flat upper surface that functions as a convenient shelf.

FIG. 3 illustrates in detail and on a larger scale the energy absorbing impact element 12 of FIGS. 1 and 2. As shown in FIG. 3, the impact element 12 has been somewhat foreshortened for convenience in illustration. The impact element 12 includes two identically configured sheet metal members 20 and 21. Each sheet metal member has a M-shaped cross-section, the leg portions 13 and 14 of which afford two generally parallel plate-like members. The leg portions 13 and 14 are upright and are oriented generally perpendicular to the longitudinal axis of the automobile. As indicated by the arrow labeled 19 in FIG. 3, the leg portions 13 and 14 of each sheet metal member are oriented generally perpendicular to the direction of a typical impact force applied by a passenger's knees in the event of a collision. Between each pair of leg portions 13 and 14 is a deformable connecting portion 15 that is bent at its midpoint to form an angle of approximately 60° with each of the leg portions 13 and 14.

The two M-shaped sheet metal members 20 and 21 are arranged one above the other and symmetrical about a plane passing between them. The two connecting portions 15 of the members 20 and 21 thus define in cross-section a rhombus having one diagonal parallel to the direction of the typical impact force 19. When an impact force is applied to the energy absorbing element 12, the element is deformed to absorb the transferred impact energy by opposite, vertically outward buckling of the angled connecting portions 15. As previously indicated, the rhombic cross-section of the combined connecting portions 15 gives the impact element 12 desirable, generally right-angled force-distance and force-time curves for impact loading.

One leg 14 of each of the M-shaped sheet metal members 20 and 21 is welded to the vehicle frame 3, while the opposite leg 13 of each member is welded to a front plate 17 which faces the seat 2. The face of the front plate 17 presented to the seat 2 is covered with a padded layer 16 fabricated of a hard foam-type material, for example. The padded layer 16 prevents injuries that might result from striking sharp edges of the metal members making up the impact element 12. Although the sheet metal members 20 and 21 are shown welded to the automobile frame 3 and the front plate 17, they may be secured to the frame and front plate in any convenient manner.

As previously described, a light cover plate 18 is welded across the ends of the leg portions 13 and 14 of the uppermost sheet metal member 20 to afford a convenient carrying shelf in the front of the vehicle underneath the instrument panel 4. The cover plate 18 is designed and fabricated of appropriate material so that it does not exert any substantial stiffening effect on the impact element 12 which might detrimentally affect its energy absorbing characteristics.

As shown in the drawings, each of the sheet metal members 20 and 21 is horizontally oriented and extends across the width of the automobile. Nonetheless, the present invention also contemplates a plurality of vertically oriented members arranged side by side across the width of the automobile.

It will be understood that the above described embodiment is merely exemplary and that those skilled in the art may make many variations and modifications without departing from the spirit and scope of the invention. All such modifications and variations are intended to be within the scope of the invention as defined in the appended claims.

We claim:
1. A safety device for protecting a passenger seated in a vehicle from injury during an abrupt deceleration of the vehicle, comprising:
   a. a shoulder belt extending diagonally across the upper portion of the passenger's body for restraining only the upper portion of the passenger's body against a vehicle seat, whereby the lower portion of the passenger's body is left free to slide forward; and
   b. energy absorbing means disposed on the vehicle in a zone in the passenger compartment forward of the knees of the seated passenger for restraining the lower portion of the passenger's body sliding forward during abrupt deceleration of the vehicle, by means of the passenger's knees impacting against said energy absorbing means, in conjunction with the operation of said shoulder belt restraining the upper portion of the passenger's body.
2. A safety device according to claim 1, further comprising means arranged serially with said shoulder belt for automatically winding up any excess length in said shoulder belt.

* * * * *

UNITED STATES PATENT AND TRADEMARK OFFICE
CERTIFICATE OF CORRECTION

PATENT NO. : 3,931,988
DATED : January 13, 1976
INVENTOR(S) : Klaus Oehm et al

It is certified that error appears in the above—identified patent and that said Letters Patent are hereby corrected as shown below:

First page, Item [30], "Sept. 28, 1972" should read --Sept. 29, 1972--; and

First page, Item [56], insert at end of "United States Patents" --3,819,204  6/1974  Oka.et al. 280/150 AB--.

Signed and Sealed this fifteenth Day of June 1976

[SEAL]

Attest:

RUTH C. MASON
Attesting Officer

C. MARSHALL DANN
Commissioner of Patents and Trademarks